United States Patent
Peterson

(10) Patent No.: US 6,915,409 B1
(45) Date of Patent: Jul. 5, 2005

(54) COMPUTERIZED INFORMATION RETRIEVAL SYSTEM

(76) Inventor: Richard Esty Peterson, 537 Valley St., San Francisco, CA (US) 94131

(*) Notice: Subject to any disclaimer, the term of this patent is extended or adjusted under 35 U.S.C. 154(b) by 124 days.

(21) Appl. No.: 10/646,540

(22) Filed: Aug. 22, 2003

Related U.S. Application Data

(60) Division of application No. 08/191,981, filed on Feb. 4, 1994, now Pat. No. 6,643,656, and a continuation-in-part of application No. 07/738,325, filed on Jul. 31, 1991, now Pat. No. 5,452,468.

(51) Int. Cl.[7] .............................................. G06F 17/30
(52) U.S. Cl. ........................................... 712/1; 707/100
(58) Field of Search ............................. 712/1; 715/852, 715/848, 836, 853; 707/100

(56) References Cited

U.S. PATENT DOCUMENTS 4,616,217 A * 10/1986 Nesbitt et al. ............... 345/421
5,101,475 A * 3/1992 Kaufman et al. ............ 345/424
5,136,717 A * 8/1992 Morley et al. ................ 712/16

* cited by examiner

*Primary Examiner*—Eric Coleman

(57) ABSTRACT

A computerized information retrieval system having consistency among a sensory network portrayed in a visual display, a semantic network that establishes the logic of data organization and retrieval and a mechanical storage network that locates data in a memory structure, the networks having an architecture based on a life tree array that splits the search and storage paths into multiple paths for rapid access and retrieval in response to user queries.

10 Claims, 12 Drawing Sheets

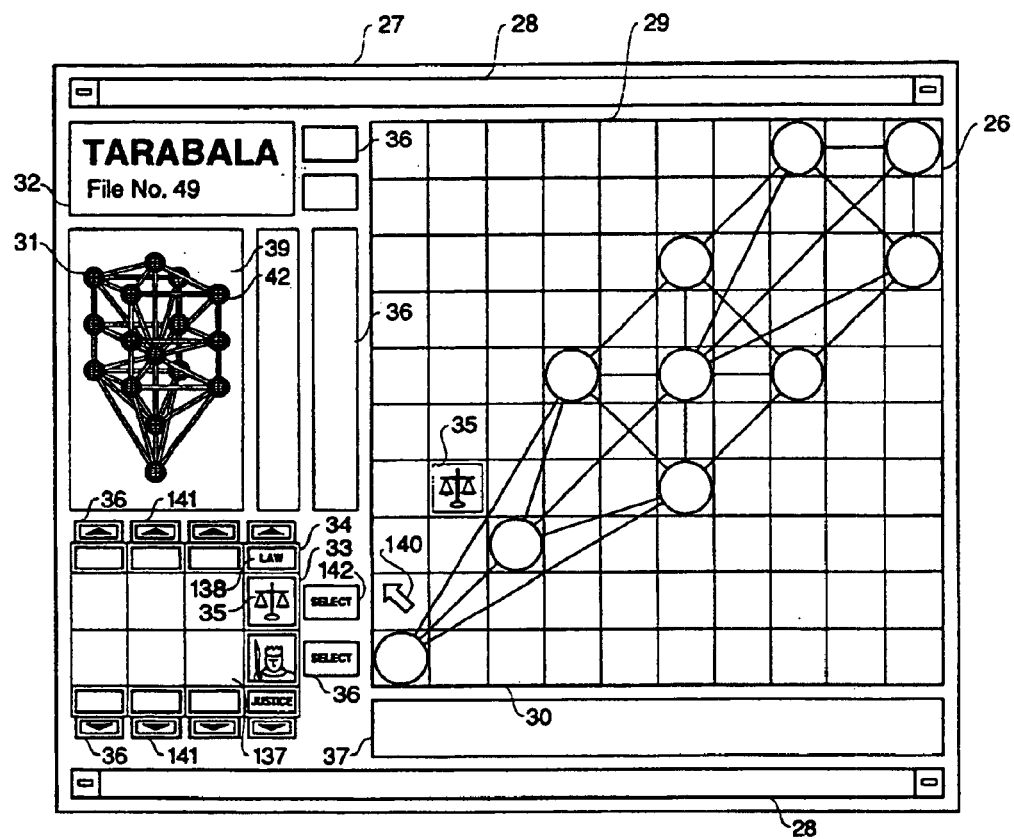
Fig 3
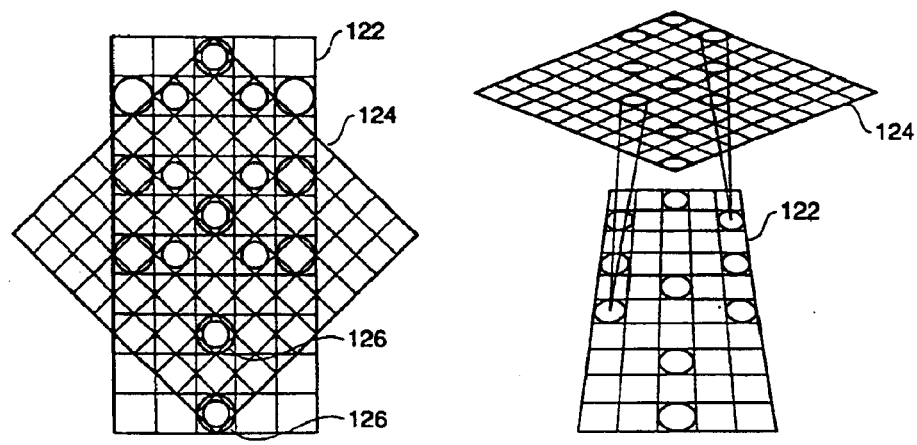
Fig 17  Fig 18

COMPUTERIZED INFORMATION RETRIEVAL SYSTEM

This application is a division of Ser. No. 08/191,981, Filed Feb. 4, 1994, now U.S. Pat. No. 6,643,656 and is a continuation-in-part of my application, Ser. No. 07/738,325, filed 31 Jul. 1991 now U.S. Pat. No. 5,452,468 of the same title.

BACKGROUND OF THE INVENTION

This invention relates to an information retrieval system and in particular relates to an architecture that inherently enhances the ability to intuitively obtain the highest quality information from a database locationally organized in a preferred, three-dimensional lattice. The constructed architecture comprises a semantic logic structure that in the preferred arrangement forms a micro computer having a processing structure with an inherent philosophical bias for locating and retrieving data in which the physical architecture of a distributed memory system parallels the visual or conceptual architecture of the logic structure. In its preferred embodiment the structured database is contained in a portable, personal deck, similar in configuration to a "smart card" that can be slotted into a computer console linked to a larger data net. The portable deck, by selection of the data forming the base and location of the data in the structure of the base, is intended to be an optimized construct that is personal t6 a particular user or user group.

This invention relates in general to the visual mnemonic icon system described in this inventor's patent entitled, Database Management Enhancement Device, U.S. Pat. No. 4,859,187, issued Aug. 22, 1989. That patent utilizes the playing card metaphor to describe a system using hierarchical sets of icons arranged in a two dimensional matrix. In that system, a mnemonic association is made between a discrete icon card and a select record, and a mnemonic interrelationship is made among selected records by the particular arrangement of cards in the displayed array.

The function of that system was in part to permit inspection of information in two dimensional arrangements on a blackboard field instead of in serial, one dimensional arrangements as is customary for books, reports, card files, and other common information composites.

Current trends in computer technology appear directed to unlimited availability of memory. Small, solid state memory cards having 8 megabytes of memory are commercially available. Inevitably, the same size card will carry 8 gigabytes or more of memory. With such increases in memory, massive quantities of multimedia information can be stored on hand, and personal data organization will be key to fast access, particularly of repetitively used items. The principles herein described may also be applied to accessible on-line databases or other large repositories of information. To retrieve data items expeditiously, parallel processing structures will be required to search multiple paths for real time queries.

At some point in the size of a database, the very physical architecture employed in design of the memory chips will affect how information is marshalled in real time systems. When multi-variant logic and fuzzy logic are used in searching and retrieving quality information in a comprehensive, deep memory database the integrity of the recovered information can be in substantial part, affected by the throughput time. As throughput time ultimately depends on the physical mechanisms designed to store the information, then actual physical loci is as important as the memory tag that identifies and qualifies the information. A memory tag in a fuzzy logic system may include descriptors that not only identify and classify but grade or weigh the information and may interact with real time retrieval by automated delay. Thus, low-grade information in competition for early throughput with more difficult to access and more time consuming to read, high-grade information might deliberately be delayed. Of course, properly tagged high grade information can be programmed to throughput a messenger with an abstract on a calling card. Ultimately, what information reaches the user first may well affect the user's judgment. The sequence of information items may well be as important as the informational content of the items.

Ideally, consistency is desired among the sensory network that is perceived by the user, the semantic network that establishes the logic of data organization and retrieval, and the mechanical storage network that physically locates data in a memory structure. This consistency enhances the integrity of recovered information and increases the confidence of the user, that indeed, the sought for information has in fact been recovered, and the recovered information is likely to be the best information available from the data net scoured.

In the referenced patent it was noted that the physical location of data need not be altered when organizing or rearranging screen formatted information. In such real-time situations involving modest quantities of data, delays in data acquisition keyed to symbolic display codes, is not noticeable or is tolerable. However, in amassing sufficient data to challenge a Turing test, the timing of data availability to carry on a real-time conversation, and the instant evaluation of data to determine its worth in a continuing, rational and meaningful conversation, are equally as important. These two factors determine whether topics of conversation change, for example, when sought for information is unavailable, or when, information slow to return should be forgotten, or if later obtained, injected spontaneously into the conversational scheme. Therefore, fuzzy logic systems are needed to evaluate information, and, heuristic structures are needed to marshal information. This disclosure does not attempt to unravel the details of the soft code scripting of the data stream, but rather to present conventions for standards of computer architecture from which scripting will logically follow.

While innovative parallel processing structures have been previously proposed such as the well-known, hypercube array, or the two dimensional grid array, these structures seek mathematical elegance and simplicity with limitations inherent in their structures. It is well know that elegant solutions promote efficiency in both operation and understanding. However, mathematical elegance should not be the sole criteria in the design of a semantic net, or in fact, the construction of hardware architecture. Intuitive and humanistic values may legitimately be a part of the hardware architecture. An example of integration of intuitive values is found in the novel invention, "Computational Origami" of Alan Huang, U.S. Pat. No. 4,943,909. That patent, incorporated herein by reference, discloses the type of multi-processor system herein proposed and the type of processor elements contemplated. Processor elements range from simple nand gates to chip computers. In Huang's patent a flexible architecture borrowed from the art of origami is proposed which allows a matrix of processors to be virtually folded like paper enabling localized replication of real surfaces, for example the wings of a plane.

In recognizing humanistic values, a unity of left-brain/right-brain perspectives can be achieved in a William Gibson, Wintermute/Neuromancer style machine. Any loss of mathematical efficiency is more than made up by intuitive short-cuts that are part of a collective consciousness. While the system described herein has a Western philosophical bias, it can nevertheless be tailored to Eastern philosophies by Jungian style, archetype transformations.

As information proliferates it degrades and a primary object of this invention is to return to the individual user a powerful tool to retrieve information in which the user can place a high degree of trust.

The astrophysicist, Roger Penrose, appreciated that parallel computers were most like the human brain. In *The Emperor's New Mind*, he defined consciousness as a means of conjuring up the appropriate judgments. Upon elaborating that this was not some form of magical "guessing," he stated, " . . . it is this ability to define (or 'intuit') truth from falsity (and beauty from ugliness!), in appropriate circumstances that is the hallmark of consciousness."

In attempting to assemble some type of collective consciousness, a system is devised that is rich in traditional western conventions to bridge the gap between art and science. An artificially intelligent machine, to have human-like intelligence, must be intuitive. The function of this invention is to devise a computer architecture that integrates classical formats for western thought and hierarchical classification into a semantic system adapted to information management. The architecture is designed to facilitate development of a symbolic language useable by computer neophytes and automated systems.

SUMMARY OF THE INVENTION

This invention relates to a computer architecture and in particular to a parallel processing system utilizing a processor architecture that is patterned after an altered, historical node and link diagram. The preferred application of the processing system is to organize and manage massive databases, and in its preferred embodiment is contained in a personal micro deck having a memory structure with multiple, integrated solid state processor arrays. The personal deck is designed to enable an individualized information construct to be built. The deck is designed to interconnect with networked computer consoles or communications systems for access to a larger data net.

In concept, the system is a combination of Hermann Hesse's, glass bead game, and William Gibson's, cyberspace. In practice the system is a combination of the two-dimensional hierarchical icon system of U.S. Pat. No. 4,859,187, and a three-dimensional lattice architecture inspired by the three-dimensional, node and link life tree model of Dr. Robert Wang. The latter is an embodiment of the kabalist's "Tree of Life", which is traditionally represented as a ten node, twenty-two link diagram. In the referenced patent it was noted that this traditional diagram suggests to the computer system engineer, a network tree for hardware or software architecture. Building on this suggestion, the two-dimensional, ten node diagram can be utilized as a visual and semantic interface to the more complex three-dimensional structure embedded in a three-dimensional matrix or lattice.

The function of the parallel processor system is to enable information to be classified and graded with actual or virtual storage correlated to the system of classification and grading. In this manner, retrieval can proceed through multi-variant classification paths with throughput data having a greater likelihood of being quality information.

In real time, the architecture of the information access structure in part defines the content of the output information. The more massive the database, the greater the effect of semantic and physical architectures on fast throughput of relevant information. In broad base databases, information will be increasingly difficult to grade and classify. A system that uses classical formats for identifying, classifying, grading, and arranging information will likely have greater credibility in returning quality information in response to any inexact query.

The function of this invention is to devise a sensory system that can be portrayed in a two-dimensional screen display that relates to the semantic network for organizing and marshalling information where the semantic network is preferably embodied in a solid state memory structure for storing information.

BRIEF DESCRIPTION OF THE DRAWINGS

FIG. 3 is an enlarged view of the screen display of FIG. 1.

FIG. 17 is a diagrammatic overlay of alternate life tree matrices.

FIG. 18 is a perspective view of the overlaid matrices of FIG. 17.

DESCRIPTION OF THE PREFERRED EMBODIMENTS

Figure 1:
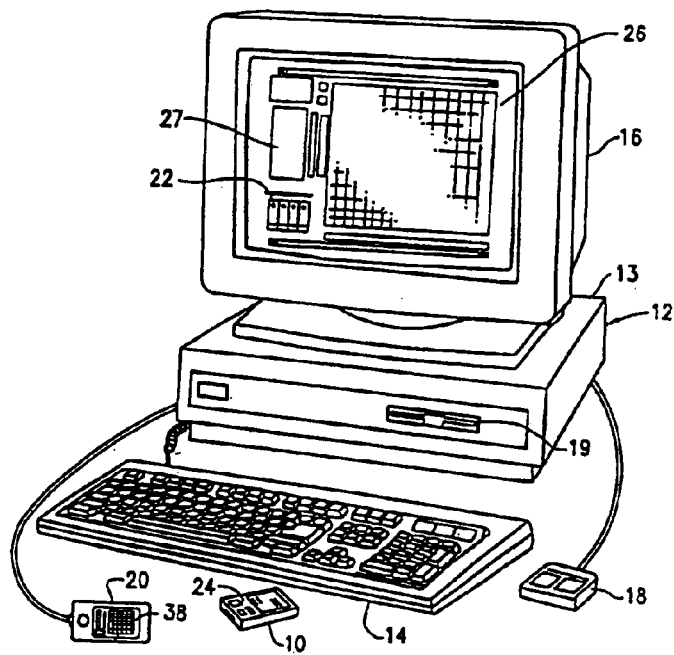
FIG. 1 is a perspective view of the deck and auxiliary console.
Figure 2:
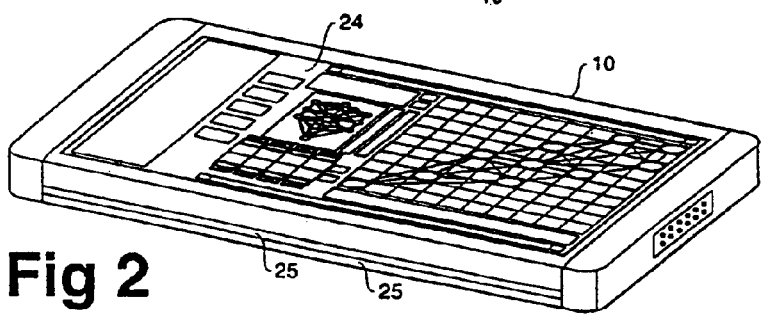
FIG. 2 is a perspective view of the deck in FIG. 1.

Referring to FIGS. 1 and 2, the system of this invention preferably centers around a portable deck 10 designed to be a personal construct utilized with a convenient console 12 such as a personal computer equipped with a processor 13, a keyboard 14, monitor 16 and preferably a point and click device such as a mouse 18 or a graphic pad 20 for activating screen icons 22. The console 12 in a more sophisticated environment will comprise a device electronically linked to communication systems, data service bureaus for networked access to all available information repositories or to the proposed National Internet. The network access can be a card receiving public communications terminal with appropriate accounting procedures.

The construct deck 10 is preferably sized to a typical playing card, and preferably is no thicker than a standard playing card deck. The construct deck 10 is designed to be slotted to any state of the art console for optimum visual and tactile input/output. In its preferred embodiment the construct deck 10 has sufficient display capabilities such as a full-surface, liquid crystal, touch pad display 24 to permit rudimentary system operation when an optimum visual interface device is unavailable. Being a miniature operational personal computer, the deck 10 is wholly self-contained and itself can contain one or more coupled smart cards 25 in a stack, but is optimized when electronically coupled to devices that enable expanded user interaction and enable the deck to connect into the larger information net served by more sophisticated equipment.

The monitor 16 under control of the construct deck 10 when the deck 10 is inserted into a deck receiving slot 19, displays a visual control panel 26 that is part of a screen graphic 27 shown enlarged in FIG. 3. The control panel 26 is an optimized graphic user interface in the form of a standard visual template for a planar logic architecture. While virtual reality systems and holographic imagery promise exciting three-dimensional interfaces, wide implementation is not likely until years in the future.

Using current, state-of-the-art technology, a construct deck 10 is fabricated using the smart card stack configuration disclosed. Referring to FIGS. 19–24, the construct deck 10 is in the form of a pocket-size microdeck 150 that is rigidly constructed to withstand significant abuse during use. The microdeck 150 has a display screen 152 and a perimeter housing 154. To maximize the area of the display screen 152, manual operating controls are mounted around the perimeter of the housing 154. Depending on the number of smart cards 25 in the form of standard PCMCIA cards utilized, the thickness of the microdeck will range between a minimum of one inch to one and three quarter inches. The thickness also depends on the type of display screen 152 utilized. Preferably, a field-emission display (FED) is utilized because of its minimum profile. An FED display having a diagonal of four inches manufactured by Pixel International of Rousset, France is preferred because of its low power requirements and design that eliminates the use of a back-light reflector. The display screen 152 is preferably color to enable the microdeck 150 to take advantage of the various color-coding classification systems described in this application.

Figure 19:
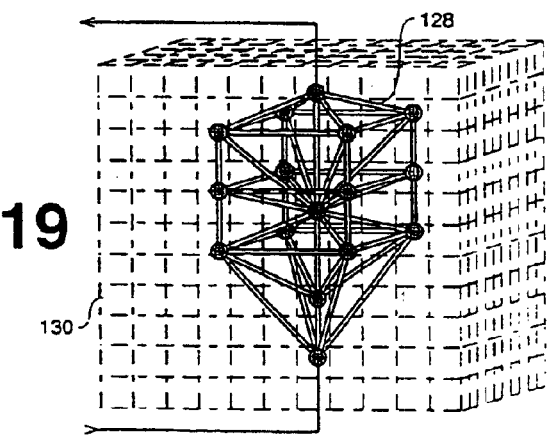
FIG. 19 is an alternate module of a life tree multiprocessor.

As noted, with reference to the construct deck 10 of FIG. 2, the microdeck 150 of FIG. 19 preferably has an overlay template 158 to enable the microdeck to be utilized by the blind, as previously discussed. The display screen 152 also includes a touch-screen membrane 156, such that virtual controls that are displayed on the display screen can be activated with the touch of a user's finger on the surface on the screen. The overlay template 158 is removable and replaceable with other templates to enable different virtual screen controls to be utilized. A template 158 is a simple stencil that is cut from a thin clear plastic sheet of sufficient thickness to provide tactile discrimination.

Although the actual construction of the microdeck may be modified from that disclosed, it is contemplated that the microdeck will provide a carriage for user defined internal components that may be easily replaced to alter the power and capabilities of the microdeck system. As such, it is expected that the structure of the microdeck will be fabricated from durable materials and have a high quality construction with lasting value. Because it is desired to maximize the display screen, the unique, ergonomic arrangement of finger controls around the perimeter of the housing 154 is designed to optimize data input and output without the use of a keyboard. The perimeter controls are symmetrically arranged on each side of the center line of the display screen and the principal controls are operated either redundantly or in tandem.

Figure 20:
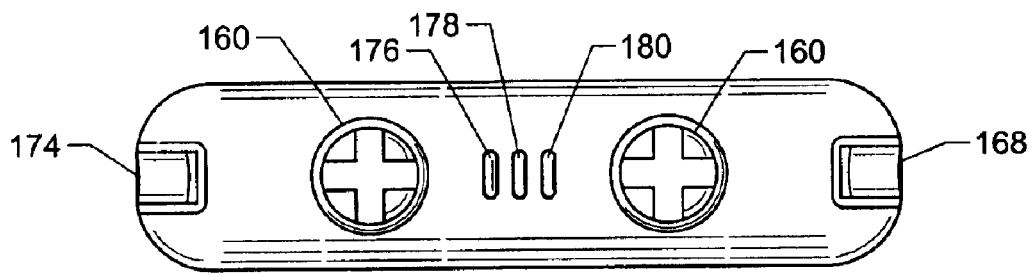
FIG. 20 is a top view of the computer of FIG. 19A.
Figure 21:
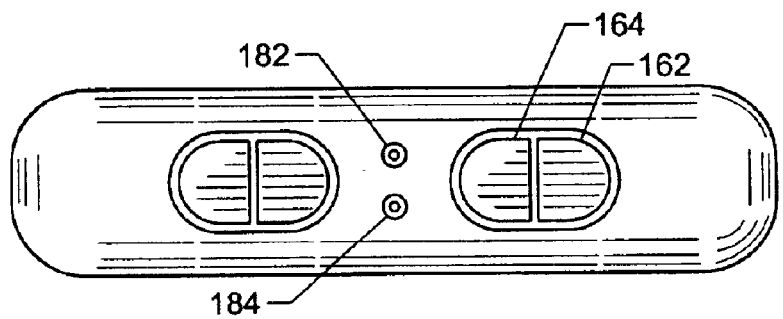
FIG. 21 is a bottom view of the computer of FIG. 19A.
Figure 22:
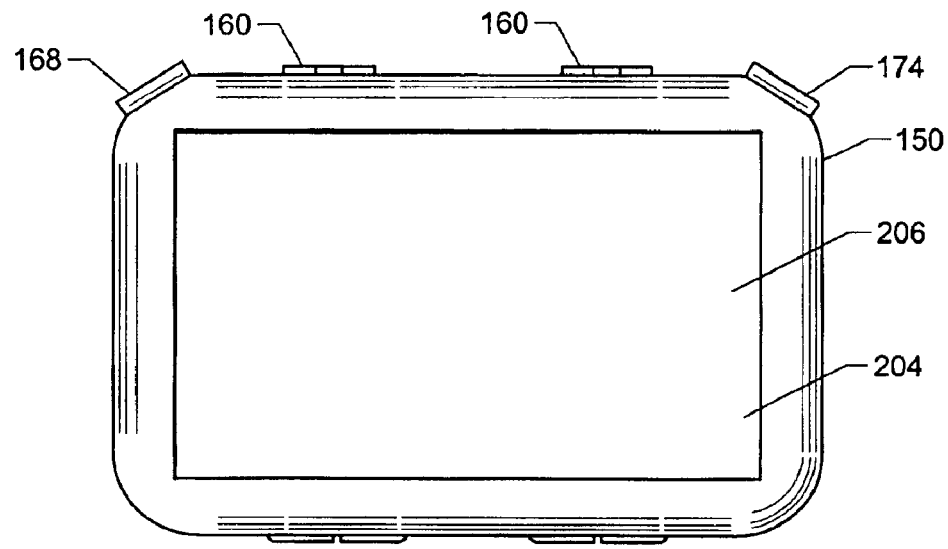
FIG. 22 is a back elevational view of the computer of FIG. 19A.
Figure 23:
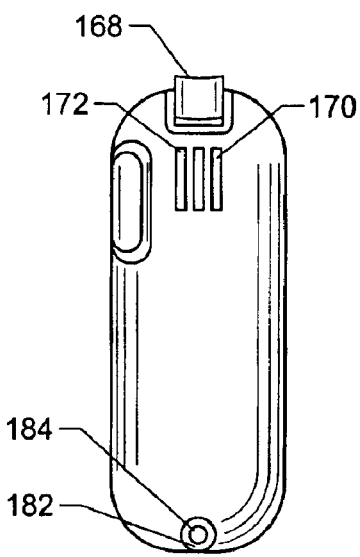
FIG. 23 is a side elevational view of the computer of FIG. 19A.

Referring to FIG. 20, the top of the microdeck includes a pair of spaced cursor controls 160 which control a single cursor or pointer (not shown) on the display screen in redundant mode, and a pair of cursors, each independently controllable when operated in tandem mode. In the former mode, either cursor control will move the cursor in a conventional manner. In the tandem mode, each cursor control 160 will control a separate screen cursor for certain software programs, for example, two player games or editing programs where one cursor selects a letter from a virtual letter bank and the other cursor selects the location for placement of the letter, thereby speeding the operation of editing. Other uses of the tandem control system will become apparent. In conjunction with the cursor controls 160 are dual sets of select buttons 162 and 164 on the underside of the microdeck 150 as shown in FIG. 21. The select buttons 162 and 164 are similarly operable both in a redundant mode and in a tandem mode.

It is preferred that the cursor controls 160 and the select buttons 162 and 164 utilize the controls and electronics manufactured by InterLink Electronics of Camarillo, California and are of a type identified as the VersaPoint Micro Module. These controls have the advantage of allowing the cursor to be moved with a velocity that corresponds with the pressure of the user's finger on the cursor control 160. As a further convenience for the user, the select buttons 162 and 164 have a redundant counterpart selection switch 166 located on each side of the display screen 152. The alternate selection switches 166 permit the user to position his thumbs from the select buttons 162 and 164 to the alternate position where the selections are activated by the selection switches 166. The selection switches 166 comprise a conventional momentary rocker switch with the forward rocker contact corresponding to the A button 162 and the backward rocker contact corresponding to the B select button 164.

Since the microdeck 150 is designed as a communication module, corner switch 168 is included to activate a digital voice recording system. The voice activation switch 168 is a similar momentary rocker switch integrated with a depression switch such that forward and reverse tracking, and on depression, a dictation mode can be incorporated in a single switch. Voice activation switch 168 is located proximate a two-way transducer unit 170 that includes both a miniature microphone and speaker (not visible) behind the air slots 172 for the unit 170. The corresponding switch 174 on the opposite side of the microdeck 150 is used for fast tracking of the dictated data in a forward and reverse direction as desired. Software for conversion of digital dictation to text that can be displayed on the display screen 152 is under development by Dragon of Massachusetts, and similar voice to text systems are under development by International Business Machines Corporation. It is to be understood that voice recognition application programs, when adapted to standard PCMCIA card transfer media, will be usable on the device disclosed.

Additional perimeter controls are located between the cursor controls 160. Button controls 176, 178 and 180 are adaptable to various uses including a device on/off switch, a screen on/off switch, and a control mode change, respectively.

Since the microdeck 150 is designed to communicate with a standard personal computer or other data processing system, communication sockets 182 and 184 are included on the bottom perimeter of the microdeck 150 as shown in FIG. 21. Where RF communication or other wireless communication requiring an aerial is utilized, an extractable antenna 182 may be telescoped from the well 180 for use. As shown in the drawings, the various controls are all oriented in wells on depressions in the perimeter housing 154. The housing is constructed with a rigid internal frame 186, preferably of heat dissipating metal such as aluminum, and a thermally conductive plastic or rubber like band 188 as shown in the partial cross section of FIG. 24.

Figure 24:
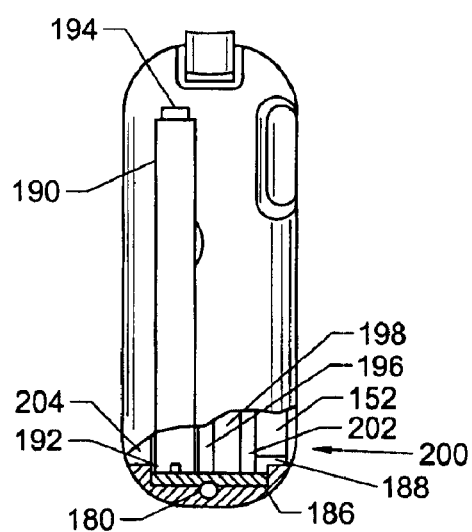
FIG. 24 is an opposite side elevational view, partially in cross section of the computer of FIG. 19A.

As shown in the end view of FIG. 24, the microdeck 150 has a door 190 to a double-deck, PCMCIA card dock 192 for receiving two standard type II, PCMCIA cards. The card dock 192 has an ejector mechanism operable by an ejector button 194 (one shown) on each side of the door 190. Card dock 192 has a pin connection to a routing board 196 that includes the circuits that interconnect the PCMCIA cards to a computer card 198 such as the Cardio 386 from S-MOS Systems of San Jose, Calif. The computer card 198 includes its own internal RAM memory and ROM memory and the necessary integrated chips for keyboard controls, display and other necessary systems to emulate an IBM PC AT. Since the footprint of the computer card 198 and card dock 192 do not entirely cover the routing board 196, the routing board can include additional surface mounted chips and components for communication and/or NTSC signal conversion. The latter is of some use to adapt smaller LCD color screens that require an NTSC composite signal for operation. This is true for use of the readily available Sharp Active Matrix LCD screens of four inch diagonal size such as the LQ4NCO1. The display screen 152 is in a component package with drivers, any necessary back light, and other screen protection such as a photo-chromatic display membrane 200 that automatically darkens when exposed to sunlight to protect the display screen from direct sunlight.

Between the display screen 152 and the computer card 198 is installed a heat sink 202. The heat sink is mounted against the computer card 198 for cooling. The heat sink may comprise a metal blank having a series of internal passages for a phase-change coolant that continually evaporates in the middle and condenses at the ends in the manner of a heat pipe.

Because a standard VGA resolution is not yet obtainable for a display screen, it is preferred that the display screen have a minimum resolution of 128 pixels by 192 pixels. This allows a card size display of 4 tiles×6 tiles. Each tile is 32 pixels×32 pixels as detailed hereinafter. Greater resolution allows gridlines and virtual controls or title bars to be added to the perimeter of the display. One quarter the VGA or EGA screen size would enable optimum graphics handling. A display screen that is 300 pixels×200 pixels provides the most convenient pixel ratio for the size and intended use of the microdeck.

Power is provided by a battery pack 204 that forms the back panel of the microdeck 150. The battery pack 204 is removable and preferably of an advanced design utilizing a rechargeable composition such as nickel-zinc. The battery pack includes the power production and power management circuit for the remaining components of the microdeck.

The back panel 206 of the battery pack 204 is constructed of a network circuit of photo cells and associated diodes to provide for recharging of the battery pack during periods of non-use. The installation of the cells in the back panel will encourage users to protect the display screen 152 by placing the microdeck face down on the display screen during periods of non-use. Both the display screen 152 and solar cell panel 206 are recessed from the perimeter band 188 for protection.

It is to be understood that the microdeck is constructed with an design that exhaults form over function. By the use of a modular internal system, each component can be replaced with the screen, computer card, and/or smart cards that a user desires. The use of a double card dock enables both a memory card and an application card to be inserted into the microdeck for customized user operation. In this manner, the microdeck can be used as a communicator using a modem card or any other desired application available on industry standard PCMCIA cards.

Figure 25:
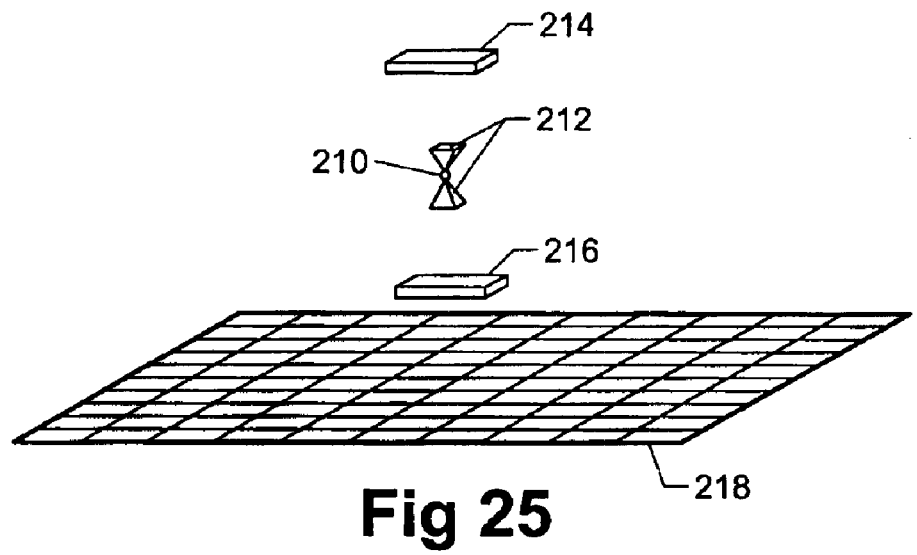
FIG. 25 is a perspective view of a three-dimensional array.

Key to the preferred planar logic architecture for the console 12 and the construct deck 10 is the matrix field of the type shown in the computer screen display of U.S. Pat. No. 4,859,187, the subject matter of which is incorporated herein by reference. There, a standard 10×10 array provides 100 portals, each of which can lead to a similar 10×10 array. A data visualization graphic showing a core system represented by a tetrahedron kernel 210 expanding through two tip-to-tip pyramid structures 212, to a one tier array 214 in one direction and a two-tier first array 216 and second array 218 array in the opposite direction is shown in FIG. 25. This descending array system permits access to over one million cells or items in the cells in three generations. The term item, in this application, means memory organization packets or mops, which may be documents, files, films, pictures, or any data package that is handled as a collective. In current computer language parlance, mops are referred to as objects or binary large objects, particularly with reference to object oriented programming systems.

At this time, the particular screen graphic 27 of FIG. 1 and 3 are devised as an expeditious use of available screen space on a standard, top-line, colored monitor such as the NEC, 4D monitor. Such monitor 16 enables visual conceptualization of the three dimensional lattice systems under consideration and reasonably rich color detail in the icon card images sized to fit the cells of the preferred 100 cell matrix. It is to be assumed that a more elegant interface graphic will evolve as equipment eventually enables virtual reality introspection, or as users develop more facile or accommodating visual interfaces for iconographic systems of the type described.

The screen graphic 27, in addition to window controls 28 of a standard operating system, provides the simulated control panel for selecting, labeling, storing and retrieving items of information and related custom and conventional icons. The standard format, preferably includes a playing field 29, here the conventional 100 cell array 30, a function pad 31, a title box 32, icon slot reels 33, scroll bars 34, a function buttons and bars 36, and a comment box 37. These elements, in general are commonly used visual control panel features, except the icon slot reels 33, which operate like slot machine reels with a loop of images or icons. Operating similar to the scroll bars 34 the slot reels 33 can rapidly run through an image loop of indeterminate size for icon or image review, selection, comparison or other use.

The use of a standardized format is designed to allow transposition to a tactile graphic input pad 20, such as an "UnMouse" by Micro Touch, using a punch-out, overlay template 38. This transposition not only facilitates operational control, but enables use by the blind when coupled with audio coding of icons. Audio coding of icon sets is a simple process, particularly when using the comprehensive playing card system of conventions taught in the referenced U.S. Pat. No. 4,859,187. The playing card metaphor teaches use of icon conventions in hierarchical sets of standardized icons that are common denominator image cards for mnemonic associations. Ideograms and images of any origin can be correlated with any of a variety of "standard" icon cards in common or custom card decks. It is to be understood that "cards" are metaphorical in nature and are electronic image representations adapted to screen manipulation. As screen locations for placement of mobile icon cards 35 are preferably fixed in the control panel layout, a tactile template 38 for identification of cells, buttons and bars, with audio confirmation on activation gives the sightless a control system to command a symbolic user interface.

Figure 4:
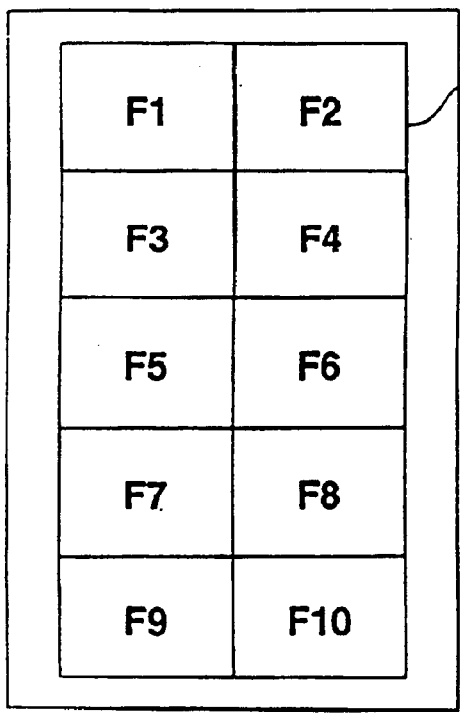
FIG. 4 is an enlarged view of a mutable window in the display of FIG. 3 showing a conventional control pad.
Figure 5:
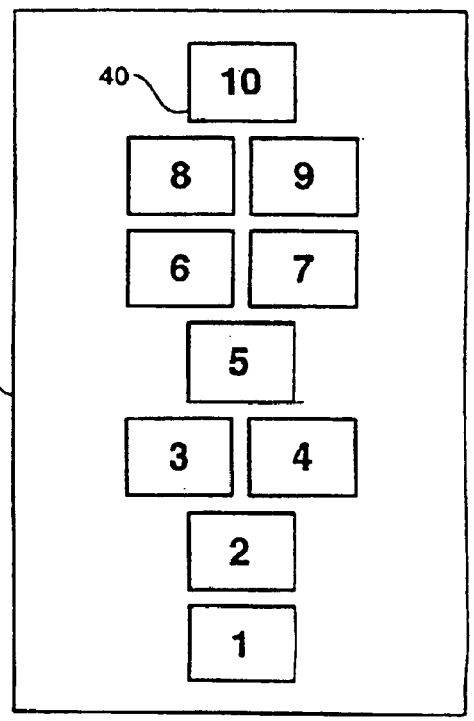
FIG. 5 is an additional view of the window of FIG. 4 showing an alternate control pad.

Referring to the screen graphic 27 of FIG. 3, it is intended that the elongated function pad 31 in the control panel 26 comprises a mutable window 39 that can portray images, text, or function pads. For example, the generic, double column, ten box, query pad 31 shown in FIG. 4 is used as a common screen interface in public library computers. Alternately, the window 39 can display other control pads such as a preferred 10 block hopscotch box totem 40, shown in FIG. 5, a kabalist's node and link diagram 41, shown in FIG. 6, or a sixteen node, Wang-tree structure 42, shown in composite FIG. 3. The Wang-tree structure 42 is a three-dimensional model of the kabalist's, two-dimensional "Tree of Life".

Figure 7:
FIG. 7 is an additional view of the mutable window of FIG. 4 showing a full size playing card.
Figure 8:
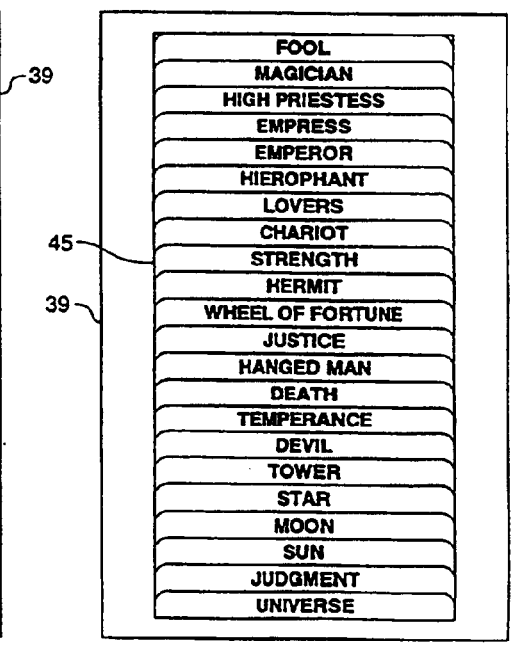
FIG. 8 is an additional view of the window of FIG. 4, showing a rack of playing cards.

The Wang-tree structure, or preferably, life tree structure 42 can be made to rotate in the mutable window 39 and appear three dimensional by use of a graphic animation program such as the software construction kit, "Toolbook" from Asynatrix. This program was used to construct the design of the control panel interface as shown in FIG. 3. The mutable window 39 is also useful to display full card images 43 as shown in FIG. 7 or racks as taught by Paul Heckel in U.S. Pat. No. 4,736,308. An exemplar playing card rack 45 is shown in FIG. 8. In addition, the mutable window 39 may display text, images or image snaps, which are images that are condensed, but not so condensed they are reduced to icons or symbolic representations of the image. The use of the life tree structure 42 is a key aid to conceptually linking a visual logic structure with the actualized physical embodiment of the distributed memory system of this invention. Once the common architectural theme integrating the two-dimensional matrix system and three-dimensional lattice system is comprehended, mental visualization is readily accomplished. The two-dimensional matrix system, the three-dimensional lattice system and the semantic bridge between them are the subject of the computer architecture of this invention.

In the preferred embodiment, the life tree structure becomes a pattern for a lattice module for a distributed memory system in which the physical architecture operationally affects the information stream. For purposes of clarity, the integration of the life tree structure with a standard Cartesian lattice is termed a life tree lattice. While lattice and matrix can be used interchangeably, matrix is here reserved for two dimensional architectures and lattice is here reserved for three dimensional architectures. An array can be both, and as used herein, generally includes a logic diagram such as a node and link network in association with the matrix or lattice, or a hardware or icon scheme in association with the matrix or lattice.

Figure 9:
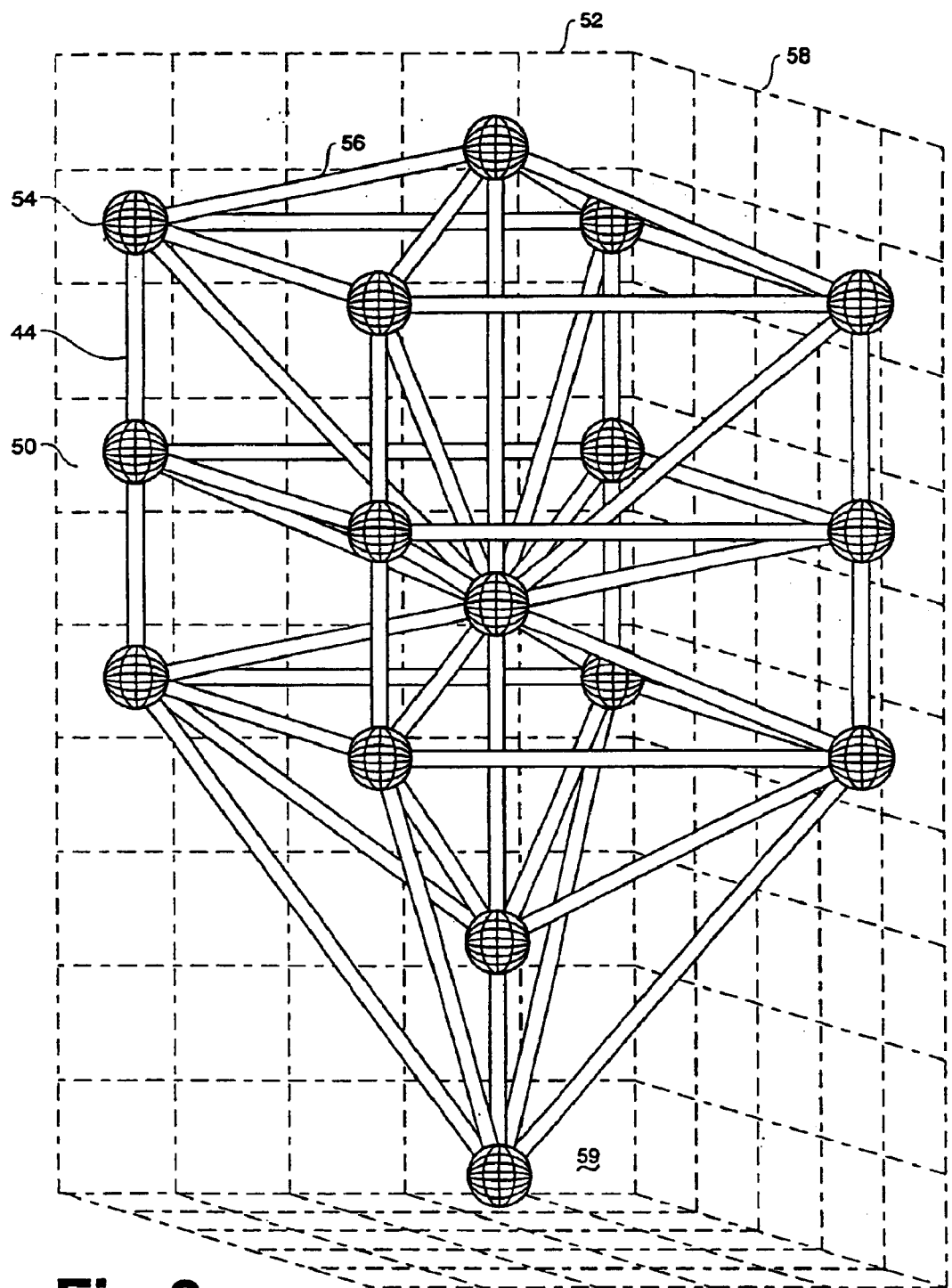
FIG. 9 is a perspective view of the life tree lattice architecture used in the deck of FIG. 1.

In the ultimate embodiment, the preferred repetitive memory architecture is a life tree lattice 44 and is embodied in a custom, three-dimensional, integrated chip 46, schematically illustrated in FIG. 9. In the practical embodiment the memory architecture is a network of interconnected processor elements on a single or stacked substrate. Because of the preferred card-size deck 10, miniaturization is essential, and advanced technologies in central processing units on a chip and memory crystals will have instant application.

In the perspective view of FIG. 9, the standard architecture 50 for computer hardware and software design proposed by this disclosure is shown. The life tree lattice architecture 50 is in the form of a life tree lattice 44 and includes a set of sixteen nodes 54 interconnected by forty-seven links 56 in a Cartesian three-dimensional grid 58 of 5×5×10 or 250 cubic cells 59. The cells can be addressed by the three coordinates of a Cartesian coordinate system such that the exemplar node 54(*a*) in the limited, bounded space for the arbitrary system of indicia 60 shown is (1,2,5). The architecture has a practical embodiment as a multiprocessor memory system 52.

Figure 6:
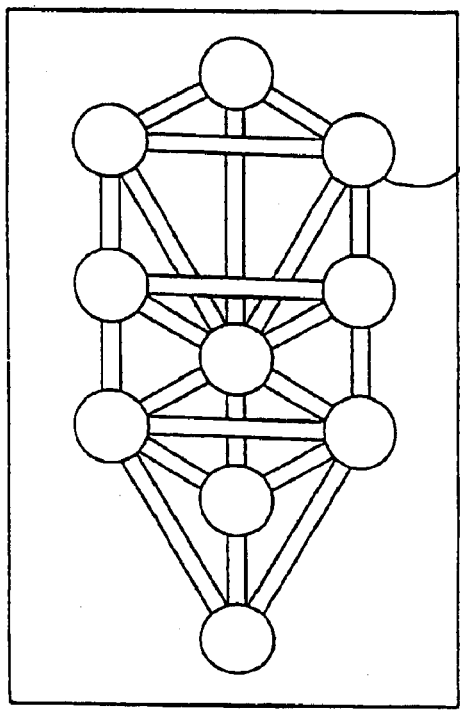
FIG. 6 is an additional view of the window of FIG. 4 showing a life tree diagram.
Figure 11:
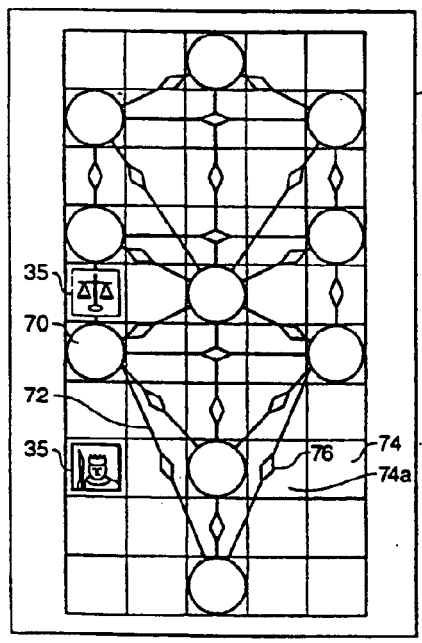
FIG. 11 is a diagrammatic view of the life tree lattice architecture of FIG. 10.
Figure 10:
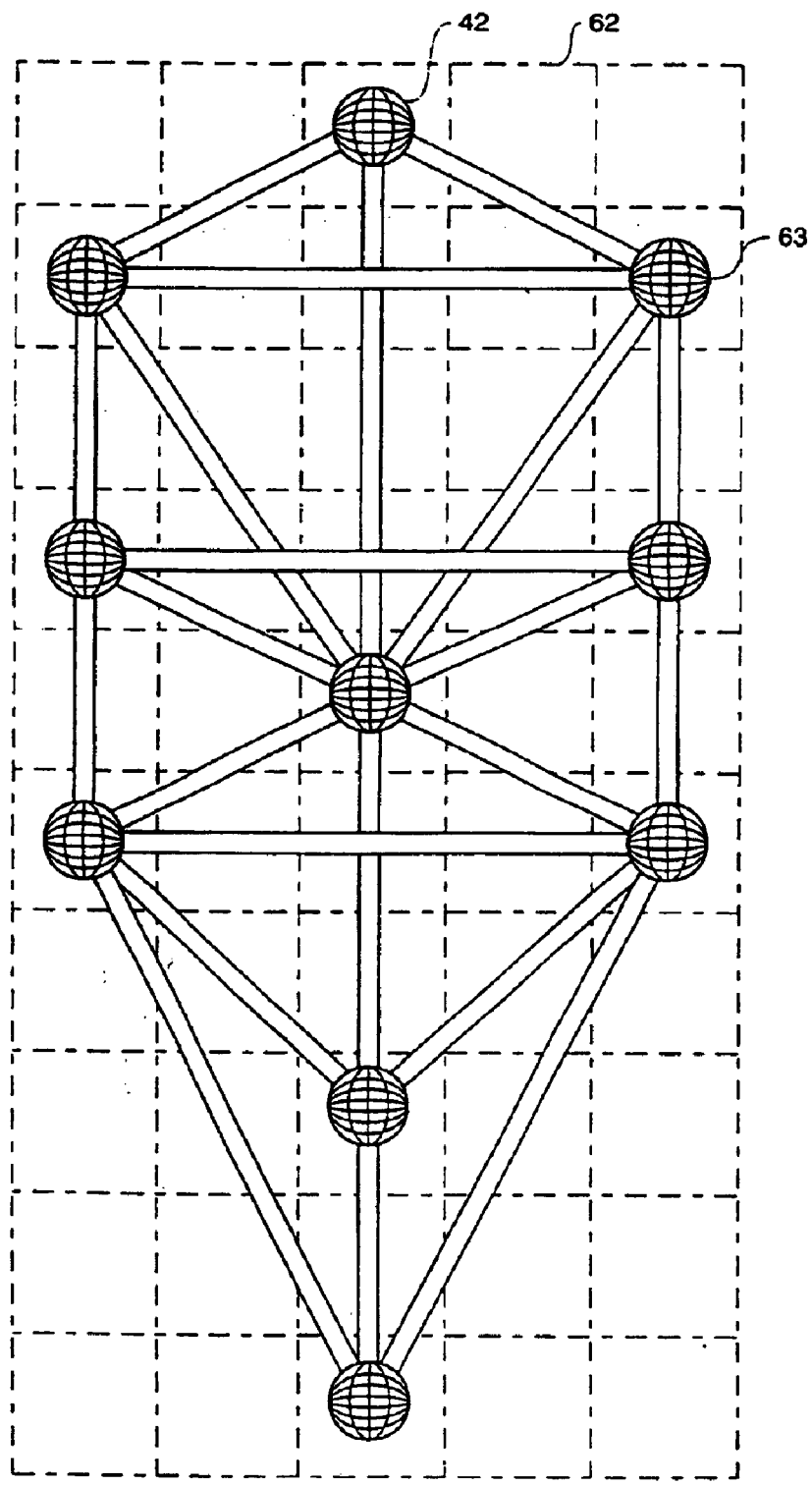
FIG. 10 is an orthogonal view of the life tree lattice architecture of FIG. 9.

When orthogonally oriented and, projected onto a two-dimensional matrix 62, as shown in FIG. 10, the life tree structure 42 appears as a "Tree of Life" node and link diagram 41 of the type shown in FIG. 6. The projected ten node, twenty-two link image diagram 62 in the 5×10 cell planar matrix 63 can be used for developing a two-dimensional, planar icon array 66, as shown in FIG. 11 and used as an alternative to the diagonally oriented life tree diagram of my referenced patent. In that patent an optimized, and hence square, playing field was desired. The projected life tree diagram 63 differs from what has become the standard "Tree of Life" diagram 41 of FIG. 6 by changing proportionality to accommodate positioning of the life tree diagram in a ten cell high grid.

The vertically oriented, planar life tree matrix 68 of FIG. 3(*a*) is easier to work with than the more obscure, diagonal life tree matrix of the referenced patent. The life tree matrix 66 in its vertical planar form can be used as a convenient note pad for icon composites until icon card placement fills most available cells and transfer to the more complex, one hundred cell square playing field is necessary. It is to be noted that the vertical life tree matrix 66 can optionally be displayed in one half of the playing field 29 of the control panel 26 freeing the remaining half for text, graphics or general commentary.

The two-dimensional vertical life tree matrix 66 has nodes 70 and links 72 associated with underlying cells 74 and for clarity the links 72 should be tagged with markers 76 as shown in the mutable window 39 of FIG. 11 to identify which is an associated link cell 74*a*. Since the life tree matrix 66 of FIG. 11 is an orthogonal projection of the life tree-lattice 44 of FIGS. 9 and 10, and the life tree structure 42 is axially symmetrical, as shown in the top view of FIG. 12, a single two-dimensional side projection can represent front 78 or back 80, or, any one of the four sides 82, 84, 86 or 88 of the four sided symmetrical structure. The particular cube cell 59 associated with a tagged link can be readily identified in three-dimensional Cartesian coordinates using FIGS. 19, 10 and 12.

Figure 13:
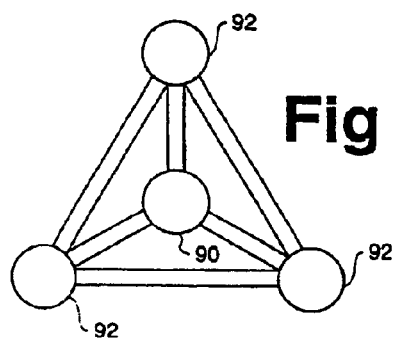
FIG. 13 is a top view of an alternate life tree lattice architecture.
Figure 28:
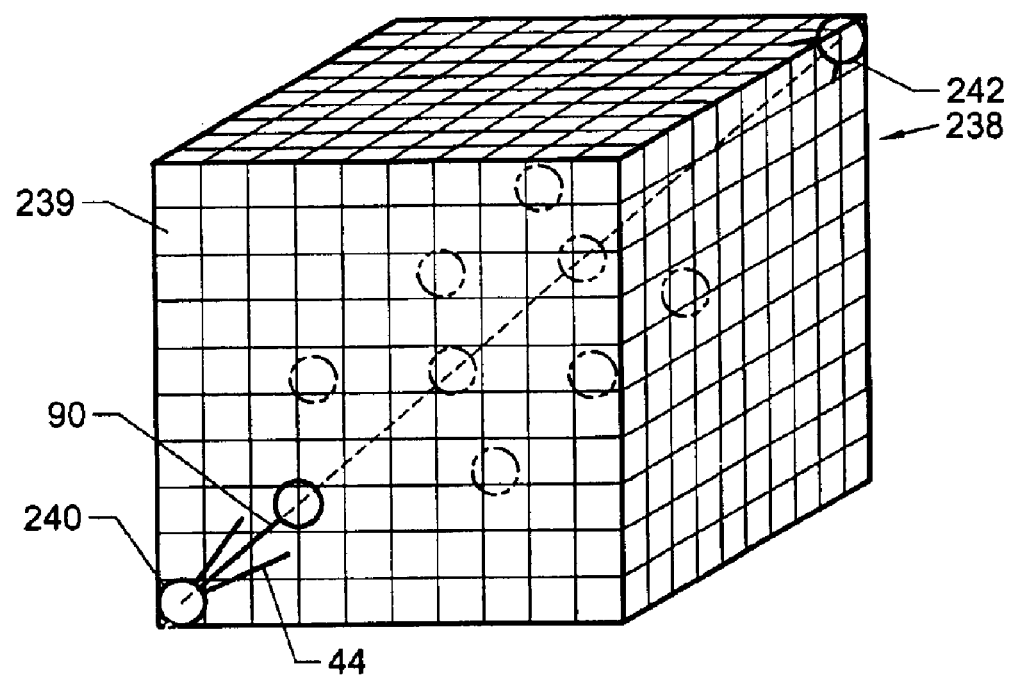
FIG. 28 is a schematic view of an Aleph cube.

The altered four-sided, Wang-tree structure is desirable for the four class, hierarchical conventions of the preferred icon set system of my referenced patent. The top view of the life tree lattice 44 of FIG. 4 shows a center node column 90 and four outer node columns 92 symmetrically spaced around the center column 90. A life tree structure having any number of outer columns 92 of three node sets symmetrically arranged around a core axis of a four node column 90 can be used, as shown by the top projection exemplars of FIGS. 13, 14, and 15. Referring to FIG. 28, the configuration of a master cube 238 of one thousand component cubes 239 in a 10×10×10 array has been solved by a life tree lattice 44 having a described core axis of a four node column 90 proceeding diagonally from a node 240 at one corner cube of the thousand block master cube, or Aleph cube, to a node 242, at the diagonally opposite cube, with three, three node columns (not shown) symmetrically arranged around the core axis for a total of thirteen nodes, as in the arrangement of FIG. 13. In order to maintain a consistent surface projection corresponding to the modified life tree diagram in the 10×10 cell matrix of FIG. 3, fifty-one links are used. A confirmation model was constructed with one thousand transparent blocks with the thirteen node blocks coated with a clear red finish and the fifty-one link blocks coated with a clear green finish. As noted hereinbefore in this application, it is contemplated that the nodes represent processors, the links represent communication buses or paths and the unoccupied cubic cells represent memory bins of predefined size, for example, a cube of picoblocks as defined.

Figure 14:
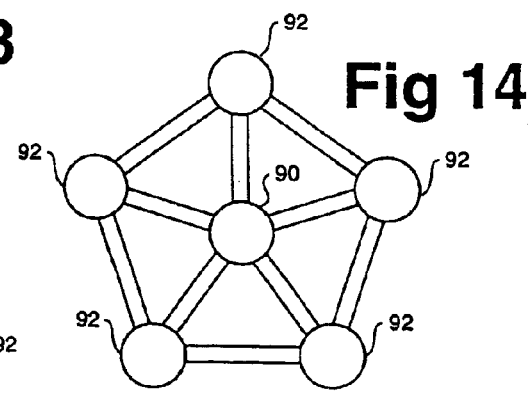
FIG. 14 is a top orthogonal view of an additional alternate life tree lattice architecture.
Figure 15:
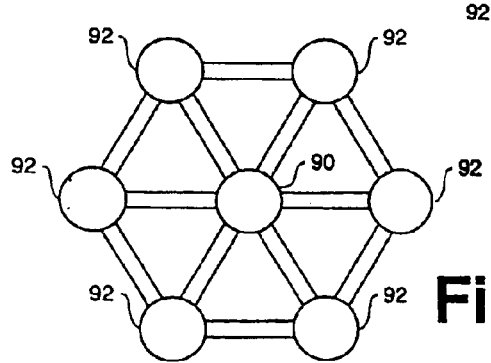
FIG. 15 is a top orthogonal view of an additional life tree lattice architecture.
Figure 19A:
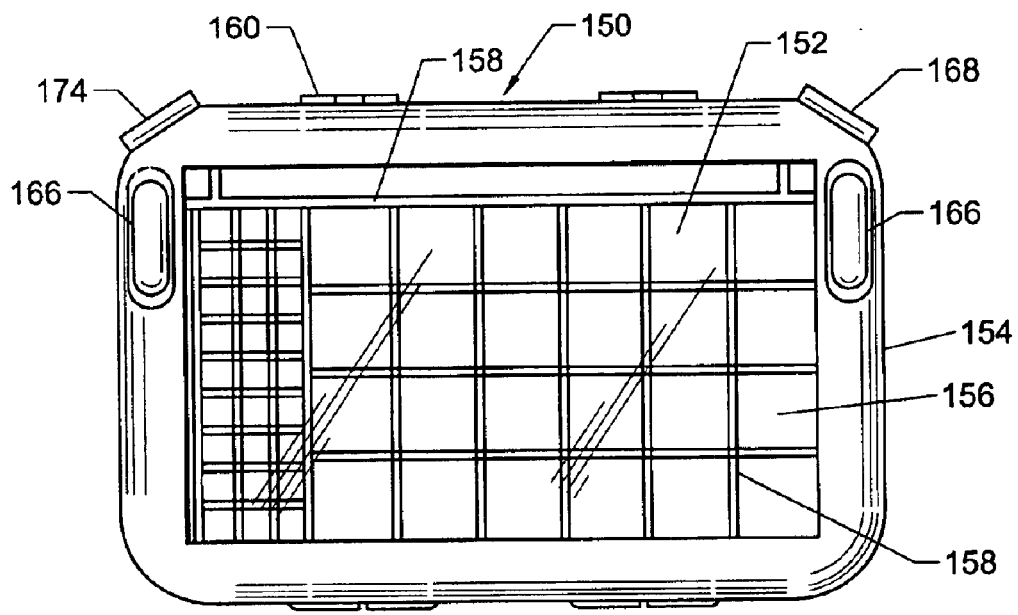
FIG. 19A is a front elevational view of a pocket-size communication computer.

Abandonment of a Cartesian coordinate system for a radial system will facilitate spatial location of nodes and links in regular polygon, top projections of node rings of numbers difficult to coordinate, such as three, five, seven, nine and the like. Color coordinated hierarchies having more than four colors may take advantage of this feature, if desired. Information can be classified as to categories and each category assigned a color with the categorical information stored in a column assigned that color. Also, card sets having five suits of one hundred cards as suggested by Piers Anthony in his fantasy novels may preferably adopt the five node arrangement of the life tree architecture as shown in FIG. 14 with each suit assigned an outer node column. Representation of any two adjacent outer node columns 92 forming a side can be translated to the two-dimensional life tree matrix of FIG. 11, since the center node column remains the same. This allows convenient translation back to the two dimensional screen display of FIG. 1 for analyzing a variety of data structures.

Figure 12:
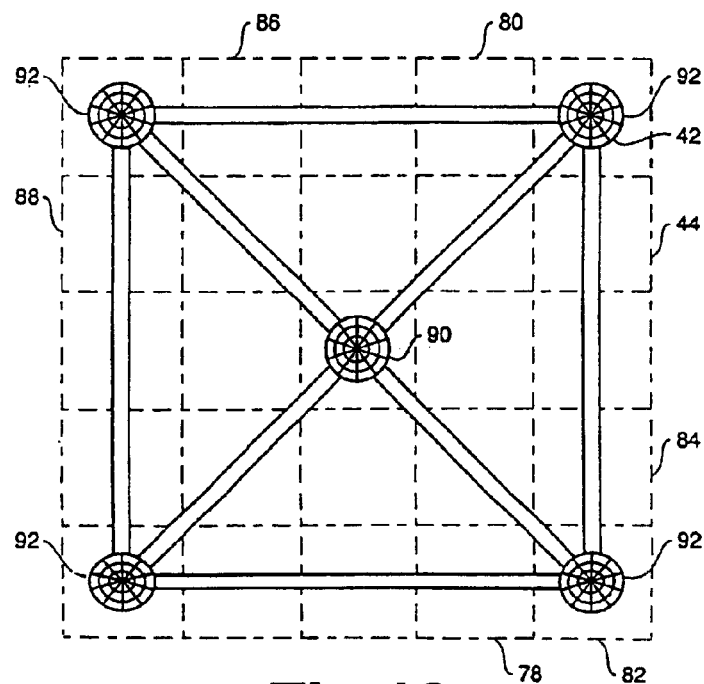
FIG. 12 is a top orthogonal view of the life tree lattice architecture of FIG. 9.

The architecture 50 of the life tree lattice 44 is used for a multiprocessor memory system 52 with sixteen processing elements 94 as shown for the preferred multiprocessor array 96 of FIGS. 9, 10 and 12. The particular array 96 of FIGS. 9, 10 and 12 operates in conjunction with a central processor, which may be an integrated computer on a chip 98 that acts as a file or data package server to expedite bit stream input and output through the number one node 100. The computer on a chip 98 also provides the controls for the user interface with the deck display 24 and the external console 12.

Figure 16:
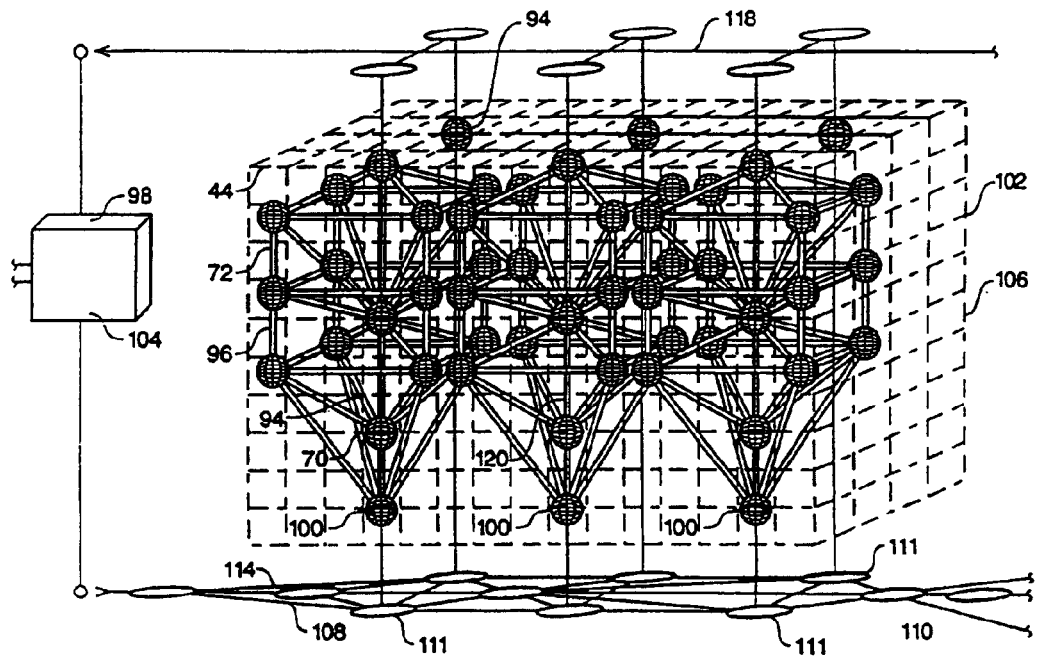
FIG. 16 is a perspective, diagrammatic view of a multi-module life tree multiprocessor.

The life tree lattice 44 in the preferred embodiment of a solid-state, memory microchip 102 is designed as a repetitive architecture that can be combined into an expanded multiprocessor array 106, as shown in the six-lattice, one thousand five hundred cell configuration of FIG. 16. The expanded array 106 can be repeated as many times as required to achieve the memory capacity desired. Access to each of the multiple, multiprocessor arrays 96 in the modular expanded array 106 is through a flat track circuit 108, which again utilizes the convention of a life tree architecture, here in a repetitive, two-dimensional, ten-node processor configuration of life tree matrices 111 interconnected end to end with the matrix side nodes 100 linked to the lattice base nodes 112 of each modular multiprocessor array 96 in the expanded array 106.

In operation, data requests are piped up through the filtered multiprocessor arrays 96, after being directed through the flat track circuit 108 where the center path of nodes 114 acts as a regulated data bus. Similarly, a flat track circuit 118 of simpler design acts as a data back bus for shipping acquired data packages back to the computer on a chip 98. The computer on a chip acts as interface controller 104 with a memory buffer to coordinate the display of the acquired information to the user.

Each processing element 94 at each node 70 preferably has its own cache and stacked memory. Each link 72 may be simply a data and instruction pipe providing a circuit interconnection between nodes 70, with data stream filtration performed by the sending or receiving processing element 94 of the node, or, performed by a filter pipe 120, where the link element has rudimentary data stream filtration capabilities. In the semantics of the logic structure the latter alternative is preferred to enable better visualization and understanding as to how information requests are filtered and executed through the network system devised.

As the desired memory architecture is more likely to be incorporated in a simulated memory architecture than in the actually constructed, physical architecture of an integrated chip, close correlation of the visual and conceptual architecture with the semantic logic structure is desired. In a virtual memory system, the semantic logic structure dictates how the software instruction set reconfigures the adopted memory structure to the subject life tree architecture. In this manner, many of the objectives can be achieved with standard components, particularly with a reduced instruction set computer that will facilitate fast access of data, and make them particularly adaptable as massive memory controllers upon appropriate configuration and data stream and instruction stream routing. Alternately, planar, solid-state configurations of standard components in a planar, hardwire circuit board can functionally approximate the three-dimensional life tree processor architecture.

The serendipitous spacing of the four center or core nodes 114 in a ten cell high lattice, at ascending one, two and three cell spacings, provides reinforcement that the adopted conversion of the classical life tree diagram has merit. A correspondence of nodes and links in the 5×10 matrix 122 with the nodes and links in the 10×10 matrix 124 of the referenced patent is diagrammatically illustrated in the matrix overlay of FIG. 17. Note only the core nodes 126 have direct geometric correspondence using the square within a square construction shown. A spaced layer ray projection of the two planar life tree matrices 122 and 124 visually illustrate this correspondence and enables quick conversion as shown in FIG. 18.

Since the principal utility of the life tree architecture is for database organization and management, it is important in adopting a processor element 94 that it would be sufficiently sophisticated to perform assigned tasks yet sufficiently inexpensive to be used in large numbers. Each processor element 94 should be capable of storing archival information, such as the user's best available copy (BAC) of an information item, in addition to the location of the original information item, or best available hard copy when such is not in digital form. The processor element should also be able to relocate data items in the memory structure. Using a weighted, most recent use and frequency of use protocol for data packet worth evaluation, the location of a data packet in the memory structure or its residence in a data cache of a processor element can be effected by appropriate programming. Coupled with whatever value tag that accompanies the data packet to deliberately delay or accelerate the data packet throughput, an effective fuzzy control over the throughput of information can be developed. As noted, messengers in the form of a key or calling card with or without a representative graphic can be returned prior to the delayed return of the complete data packet, or, the return of the complete data packet after command by the user. As noted, it may not be an economical use of processing capability to return an entire data packet, such as a book, when a visual of its jacket and a summary of its content and cataloging data is sufficient for initial inspection by the user. The user can then decide to call in the data packet by a direct line priority established through a link in the key or calling card which may have to retrieve the item from an auxiliary component such as a CD-ROM.

The tag to the information item should also include any tolls required for use which is coordinated with the integrated computer chip 98 for generating an automatic accounting register for copyright royalties or license fees.

The repetitive use of a life tree lattice will enable a modular programming scheme to be developed to effect information storage and access in parallel structures. The staged system of a ten box function totem, a life tree matrix, and a life tree lattice provides interrelated structures of increasing complexity for development of an object oriented, semantic language comprehensible by the ordinary user. The common structure comprises a tradition driven architecture for computers and hence should be comprehensible by the average user.

While the preferred deck 10 is constructed with multiple modules with memory storage associated with each processor element, alternate processor and memory storage configurations are appropriate.

For example, in FIG. 19, a single life tree lattice 128, with an expanded lattice domain of 11×11×11, or 1331 cells 130 is provided. In this configuration lattice cells proximate a processor element comprise the associated memory and as a memory cache of a processor element fills, the data bleeds into a proximate cell for storage. The cells are conveniently addressed by the Cartesian coordinates system of the preferred lattice architecture. Memory stacking into adjacent cells occurs as the most proximate cells fill. This procedure continues until the entire domain is filled.

Alternately, a mix of a modular virtual memory system comprising multiple modules and an actual hardware system having but a single life tree, multiprocessor network as shown in FIG. 9 is a practical comprise. This allows an extended visual network to be generated, but with a memory structure having a more limited number of processors. Finally, a single processor system can utilize the life tree lattice architecture for a visual and semantic formatting with a virtual storage system that appears to function according to the scheme disclosed. The visual format at the life tree lattice can include a node partitioning as shown in FIG. 9 with cells 134 comprising image windows 136 as in the 1991 Mariah advertisement of Symmetry Corporation. Storage on conventional hard disks with track and sector patitions coordinated with access time determining data packet location and search protocol.

In operation, the control panel 26 provides a means to organize and store information in the form of data packets which are both lodged in a memory structure and retrieved using an evolving symbolic and structural language that is grounded in western, Judeo-Christian metaphysical tradition. A wealth of definitional and correlative literature, including a spectrum of existing image and symbol card sets is already available. This literature can be used in development of a data model with a time dependent, event driven architecture that is culturally familiar to both designer and user.

Icons are severely abbreviated visual representations of larger information packets. Manipulation of the abbreviation is an expedient means of manipulating and comprehending the manipulation of a larger information accumulation. Using arrangeable hierarchical icon sets, interrelated information items can be displayed symbolically in iconographic matrices.

As a severely abbreviated representation, the information content of an icon for the occupying visual area is high. Icon selection therefore is important. The problem of appropriate icon selection to a user resulted in the convenient mechanism of presentation by slot reels 33 shown in FIG. 3. While icon palettes can be presented in the playing field 29, the use of slot reels suggests a method for artificial selection using not only word list comparison, but image comparison and ultimately, techniques of image unification allowing icon selection to be accomplished automatically.

In the control panel 26 devised, the slot reels 33 enable loops of images to be visually compared. Since image loops can be loaded in any manner desired and pared down as the selection process proceeds, a rapid means of refined symbol and icon selection is provided.

The use of slot reels in above and below paired windows 137, allows a means of visually comparing icons in close proximity. The use of slot reels in rows of four windows across enables categorical displays using the preferred four class semantic architecture selected as most traditional.

The proximate comparison of icons is useful, for example, in situations where graphical representations identifying information items are to be compared with archetypical representations or glyphs selected from icon sets acting as universal common denominators. Rapid comparisons can be made with the slot reels. In situations where icons from one icon set are compared with icons from another icon set, the convenience of proximate icon windows is apparent.

If the icon is an abbreviated graphic of a more detailed image, the mutable window 39 can be used to display a more representative snapshot of the image while icons are being scrolled. It is to be recognized that the mutable window is approximately card size for advantageous display of large image cards. Thus full size cards can be displayed in the mutable window in sequence with icons being displayed in the slot reels. Card images can be animated for effect if desired. Ultimately, the entire playing field, or for that matter, where a monitor is employed, the entire screen can be applied to image display during icon selection if necessary. At any time any of the display fields or windows can be used for text, document, drawing or other display when advantageous.

The scroll bars 34 above and below the slot reels 33 generally display abbreviated icon monikers 138 in text form accompanying the portrayed slot reel icon 35 in graphic form. Text characters exceeding the limited scroll bar space are fully displayed overwriting the screen tools on activation by a screen pointer 140. Reel spin buttons 141 activate the reels upward or downward as desired. Select buttons 142 enable the icons to become moveable icon cards when dragged by the pointer 140.

The card metaphor provided a powerful heuristic for associating and visualizing information. It functions as a classic memex as described by Vannevar Bush in his 1945 article, "As We May Think," in the Atlantic Monthly. The essence of this program is A≈B. This is a mathematical expression meaning A is like B, not identical, but similar. The first metaphor used in this system, as noted, is the card. Cards have two sides, can freely move about, generally come in sets, and for our purposes can be divided into two primary classes, playing cards and trading cards. Like their real world counter parts, playing cards are hierarchical and very generic, and trading cards are somewhat particular. Both are convenient, short-hand devices to identify and compare things.

The heuristic system is also a codex based on the numbers 10 to define the architecture, and 16 to define the content or essence. The framework is centered on the cell. A cell is a container of data. Cells are arranged in frames. Essence attempts to capture the identity of information in the cells and in the frames. Data is organized in packages, called memory organization packages, or mops. Parts of cells or groups of cells may define mops. The goal of the system is to specify intuitive default conditions for data structures to allow fast access to these mops using the technique of information visualization.

Key to the operation of the program is the association of cards, i.e. playing cards with playing cards, trading cards with trading cards, and playing cards with trading cards. The cards are in turn associated with other digital items such as files, documents, or large objects like movies, books and recordings. A principal feature of this program is card linking where one card is linked to another. As in the memex, an essential feature is associative indexing, whereby any item may be caused at will to select immediately and automatically another. Two items are thereafter tied together by links.

Cards are represented in a realistic size on a computer screen. Trading cards may be represented in the form of index cards, business cards, file cards, or other data containing forms that mimic baseball cards, combining graphics and text. Trading cards may come in groups arranged in stacks with data on two sides of each card.

Playing cards come in decks that mimic common playing cards in fixed size sets with a hierarchical order. Playing cards also have two sides with combined text and graphics.

Each card has a small counterpart icon. The small icons are, in effect, moveable buttons or tiles, that can be moved about to form a composite mosaic as the user desires. Preferably, the card icons are arranged in an array, which is a matrix or grid having cells into which a card icon conveniently fits. A ten by ten array can hold up to one hundred card icons.

Each card icon is an abbreviated version of its counterpart playing card or counterpart trading card. Playing card icons are called informational icons, or for short, infocons. Trading card icons are called data icons or, for short, datacons. Infocons and datacons can be coupled together front to back and moved about as a single unit. The coupled card icons are called intellicons, that is, smart icons that couple.

Intellicons can be flipped by the user to show one side, the infocon, or the other side, the datacon. If desired, all intellicons in a mosaic can be flipped at once, to show either a mosaic of infocons or a mosaic of datacons. Each side of the intellicon is linked to its counterpart playing card or trading card, and may be directly linked to associated large digital items. In the case of an infocon, this may be a dictionary file providing the characteristics or attributes of the counterpart playing card. A characterized infocon can serve as an intelligent agent with a predefined attitude. The datacon, as noted, is less glamorous and is usually linked to a trading card defining and leading to a MOP, such as a file, record or other binary large object that may be conveniently stored internally in cells, or externally on an accessible storage device like a disk or CD.

Figure 26:
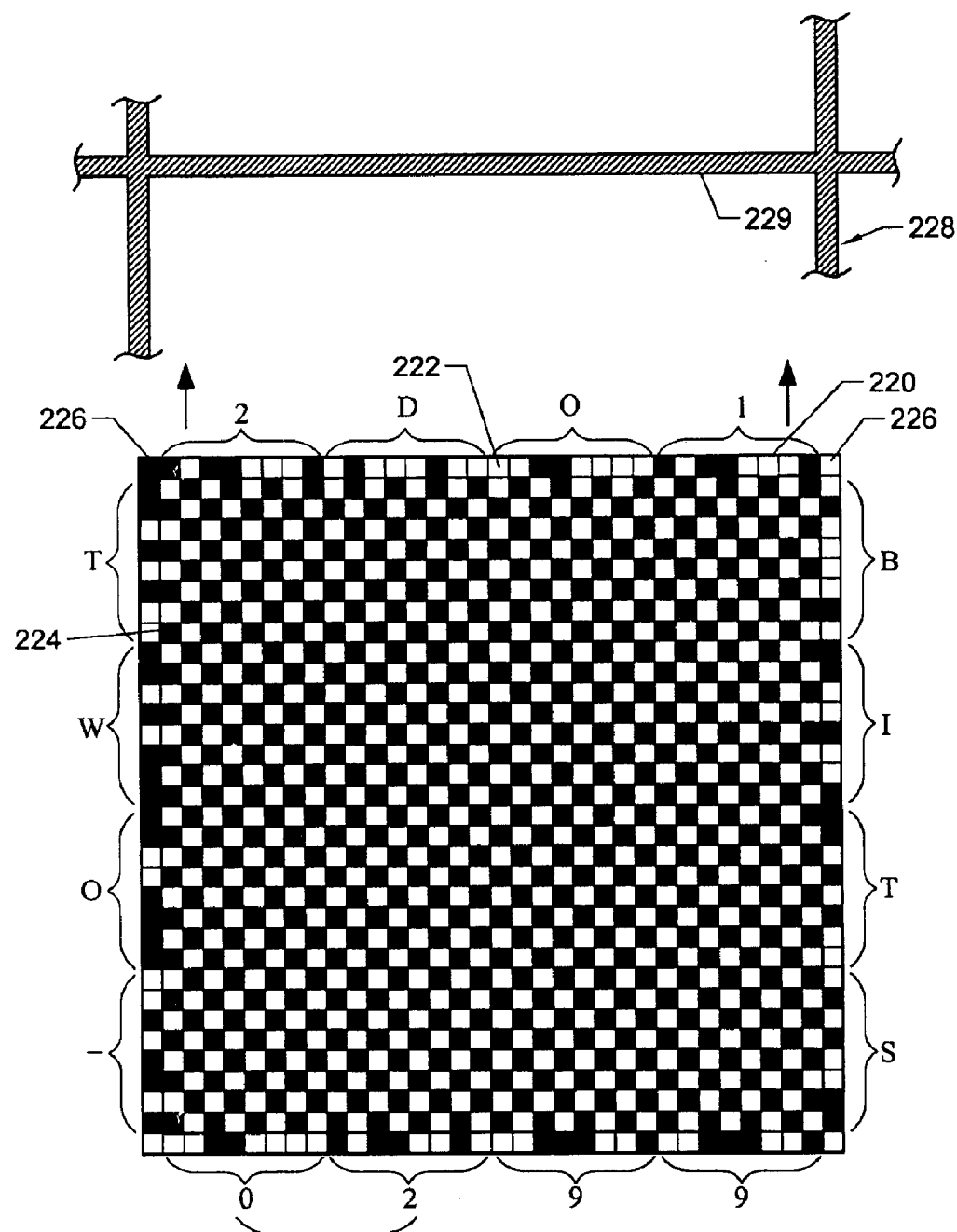
FIG. 26 is a schematic view of an enlarged bit square and grid.

The preferred is a version of the card metaphor system is based on default conditions. The default conditions are set to natural standards, such as a standard grid size forming a 10×10 frame of one hundred cells as shown in the array 30 of FIG. 3, and, a standard icon size formed of a 32 pixel×32 pixel square tile 224 as shown in FIG. 26.

Playing card decks come in set sizes of generally no more than 100 cards in preferably five color-coded suits, although multiple decks may be employed. Playing cards need not look like common playing cards, so long as they establish hierarchical conventions by color coding, numerical coding or other ordered, distinguishing means.

Trading card stacks are generally unlimited in the number of cards, although for user convenience, stacks may be organized in sets of 100 cards per stack.

Each cell in a one hundred cell frame is linked to a frame also having one hundred cells. The arrangement of frames is in tiers, such that a top tier has one hundred cells that link to a next level tier of one hundred frames with a total of ten thousand cells, which in turn link to a next lower tier of ten thousand frames having one million cells, and so on.

This pyramidal framework can be represented in a three-dimensional, tiered array in cyberspace as shown in FIG. 25. Thus, the schema of a large database can be graphically represented as a well-ordered datanet or cybernet where the user can zoom around a wire-lattice from frame to frame and hence into any box-like cell for access of an intellicon, which is thereby linked to its counterpart cards and to their linked binary large objects.

Figure 27:
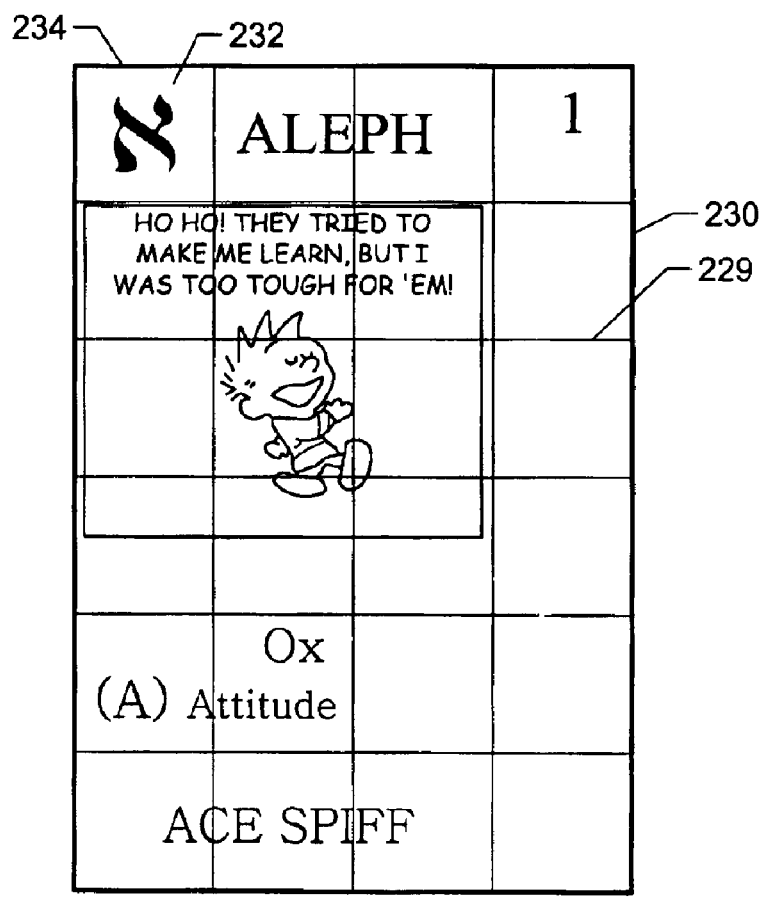
FIG. 27 is a schematic view of a card composite.

The desktop is a dead metaphor. Console cowboys don't want desktops with file folders and file cabinets. They slot cards into decks, and navigate cyberspace from virtual control panels. The real world disk and PCMCIA card are better metaphors for a portable digital data container. Disks and PCMCIA cards contain programs, documents or any other digitalized thing. Square disk or square card icons are suited for compact group display in the form of tiles in a mosaic as shown in FIG. 27.

In the tile/card system devised, the architecture of the lattice construct is based on the number 10 with the standard frame formed of a 10 by 10 array of 3-D boxes. The system is also based on the number 16, that is, a standard icon tile drawn and quartered into 16 pixel by 16 pixel sectors and the number 64, a square tile group of four tiles forming a 64 bit×64 bit composite.

The standard 32 pixel square, icon tile is conveniently coded in contemporary 32 bit-byte processor platforms. For convenience, the 32 pixel×32 pixel square is called a main size tile, the 16 pixel×16 pixel square is called a minor size tile and a 64 pixel×64 pixel square (i.e. in 64 bit word processors) is called a major size tile.

By thinking of a 32 bit word as a slice like a cross slice of a cell in movie film, icon tiles can be coded as a continuous film strip. Using one 32 bit slice as a header and one 32 bit slice as a trailer, a standard "tablet" for the main tile, is constructed. The 32 bit, 34 slice tablet is like a moving picture frame without the side bars. These side bars can always be added later as shown in FIG. 26, or carried in the tablet as a double header and double trailer. Icon tile tablets and a pile of associated graphic tablets of similar size (that might code for color or make a composite picture) and/or a pile of general data tablets (that might code for text or navigate the way) can be stacked 34 high in blocks, boxed and crated as a tile/card system kernel. The tile/card system kernels are stashed in the 3-D cells of the wire frames making up the tiered lattice construct of the cyberspace array.

The tile/card system kernels are bit cubes, 32 bits×32 bits×32 bits, boxed in a one bit thick shell forming the crate. The crate provides the headers, trailers and coding tags for the data in the body of the tablets and in the bit cubes as a whole. For convenience, the tile/card system kernel in a terabyte system is called a picoblock. The picoblock is formed of the 34 high stack of 34 bit×32 bit tablets, plus two extra side tablets (to fill out the 34 pixel wide crate) and four corner strips of 34 bits each, (useful for matrix or array tags) to complete the crate cube.

Alternately, the picoblock can be visualized as a block of 34—34×34 bit squares, a typical square 220 shown in FIG. 26. The square has a coded perimeter frame 222 around a standard main tile 224 that is a 32 bit×32 bit square having a checkered pattern. The perimeter frame is here coded in ASCII to read 2D01, TWO-, BITS, 0299. The corner bits 226 are preferably reserved for state, i.e., empty or filed, or orientation, i.e., left-right or upside down. The bit square can be stored like a black and white bit map with the coded perimeter frame stored along with the graphic image or data block forming the 32 bit×32 bit square. When the 34 bit square is visualized as a black and white pixel map and moved onto a matrix 228 formed of one-pixel wide grid lines 229, the code frame 222 becomes masked by the grid lines.

Multiple bit squares can be assembled into a composite as shown in FIG. 27, where a playing card composite 230 is shown. The card image can be shown without the grid lines 229 and code frame 222 by a simple software subroutine use in many existing graphic programs. Construction of the card composites is accomplished using the PictureClip routines of Visual Basic from Microsoft Corporation. An icon square, such as the Aleph ideogram square 232 in the top left corner cell 234 of the card composite may be used as a miniature icon card 35 to represent the full card composite 230 in the playing field 29 of the screen graphic 27 of FIG. 3. By checking on the Aleph ideogram square 232, the card composite would appear in the mutable window 39 of the screen graphic 27. Notably, the mutable window 39 is sized to display the content of the screen display of the microdeck 150. In this manner, the console 12 can be used as a graphic and text editor to design card sets, templates and other graphic and text displays for the microdeck.

Each square of the card composite can link to other mops when a pointer is located on the cell in which the cell resides. Also, as noted, the card composite can be flipped to a backside which may have a format of conventional text based fields of a customary relational data base form.

While primarily designed as a visual database management tool, tile/card system provides a platform for language translation, network administration, graphic image editing, event tracking, project management and other uses. The design of the control panel and architecture of the processing system emphasizes simplicity of use.

No prior computer experience will be required to use the application.

These tools, including buttons, bars, windows, etc. facilitate icon selection for application to information packets and arrangement in the two-dimensional display matrix of the playing field 29. Ultimately, these tools enable mops to be lodged in the memory architecture devised for heuristic retrieval. By appropriate data diddling the memory packets can be interlinked in a Ted Nelson styled hypertext data net.

The life tree matrix and lattice of this invention provide a common format for a computer architecture adaptable to pipelined execution hierarchies for intuitive and intelligent pathworking to attain the objective of fast access to quality information. Those skilled in the art will recognized the application of this system to artificially intelligent, organization and retrieval systems, particularly machine intelligent databases.

It is to be understood that implementation of the ultimate embodiment of this system relies on the contributions of many creative, innovative and inventive individuals, particularly those credited herein. The improvements described herein builds on these creative concepts and attempts to combine and consolidate them into a device for empowering the individual. The devised system is directed to development of a data construct deck that is personal to a user and is designed to be carried with the commonality of a credit card.

While, in the foregoing, embodiments of the present invention have been set forth in considerable detail for the purposes of making a complete disclosure of the invention, it may of skill in the art that numerous changes may tail without departing from the spirit and invention.

What is claimed is:

1. A computer system comprising a central processing unit, a visual display device, a data storage device, and a common semantic network architecture for organizing information in three-dimensional conceptual space, wherein the network architecture includes a visual format means for organizing information on the display device, a logic protocol means for classifying and marshalling data packets representing the information, and a memory structure means for locating data packets stored in the storage device; the computer system having a structured database with information stored in the database in fixed size data tiles of 32 bits by 32 bits with a one bit frame, forming a bit packet 34 bits by 34 bits in size.

2. The computer system of claim 1 wherein the bit frame comprises code tags related to the data in the data tile.

3. The computer system of claim 1, wherein 34 framed data tiles are stacked forming a 34 bit by 34 bit by 34 bit block identified as a picoblock.

4. The computer system of claim 1, wherein the central processing unit operates on a 32 bit word platform and the data tiles, bit frames and bit squares are processed in a sequence of 32 bit words.

5. The computer system of claim 3 wherein the central processing unit operates on a 32 bit word platform and the picoblock is processed in a sequence of 32 bit words.

6. The computer system of claim 3 wherein the picoblocks comprise the data packets and the code tags on the picoblocks comprise means for classifying, marshalling, and locating data in the picoblocks.

7. The computer system of claim 6 wherein the data storage device comprises a memory divided into cells, each cell being sized to accommodate a picoblock, wherein the memory has a semantic architecture visually displayable as a matrix of cells in a three-dimensional lattice, and the processor has means for activating visual display of the lattice in the display screen.

8. The computer system of claim 7 wherein information is organized in memory organization packets and a memory organization packet is constructed from one or more picoblocks.

9. The computer system of claim 8, wherein a memory organization packet comprises a binary large object and the data storage device includes means for storing binary large objects, wherein a memory organization packet is represented by one or more picoblocks having identifying pointers for accessing the represented binary large objects.

10. The computer system of claim 9 wherein a plurality of picoblocks are grouped in a cube of picoblocks, the cube of picoblocks dimensionally defining a cell, wherein the semantic network architecture for organizing information in three dimensional conceptual space comprises a lattice of cells.

* * * * *